United States Patent [19]

Spiel

[11] 3,912,824
[45] Oct. 14, 1975

[54] HIGH-PROTEIN QUICK COOKING MEAT-LIKE FOOD MADE FROM PLANT PROTEIN MATERIALS

[75] Inventor: Albert Spiel, Yonkers, N.Y.

[73] Assignee: Harold A. Hoffman, New Rochelle, N.Y.

[22] Filed: July 3, 1974

[21] Appl. No.: 485,616

Related U.S. Application Data

[60] Division of Ser. No. 275,957, July 28, 1972, which is a continuation-in-part of Ser. No. 218,117, Jan. 17, 1972.

[52] U.S. Cl. ............... 426/630; 426/431; 426/629; 426/632; 426/634; 426/656; 426/802
[51] Int. Cl.² ..... A23J 3/00; A23K 1/14; A23L 1/20
[58] Field of Search ........... 426/362, 431, 212, 802

[56] References Cited
UNITED STATES PATENTS

| | | | |
|---|---|---|---|
| 2,162,729 | 6/1939 | Levinson et al. | 426/268 |
| 3,485,636 | 12/1969 | Hoffman | 426/362 |
| 3,620,755 | 11/1971 | Hoffman | 426/199 |

Primary Examiner—James R. Hoffman
Attorney, Agent, or Firm—Fisher, Christen & Sabol

[57] ABSTRACT

A method is disclosed for preparing quick-cooking food products which are palatable, bland, light colored, meat-like in texture, chewable chunks when hydrated. Plant protein material such as, solvent-extracted soybean meal or flakes, or peanuts, sesame seeds, cotton seeds, lentil beans, etc. containing some moisture is subjected to a pressure of at least 1,800 pounds per square inch for a time and at a temperature sufficient to convert the moisture into steam. As a result, the plant protein material is rendered partially or substantially bland, e.g., disembittered, toasted without scorching, and compacted into a hard and substantially fused mass which is textured or meat-like when hydrated. The mass is fragmented into chunks which are preferably graded. The chunks are heated in hot or boiling water for a period of time selected in accordance with the mean size of the chunks and sufficient in length to substantially hydrate the chunks and to dissolve out some of the soluble constituents whereby the chunks are softened to a chewable consistency. The chunks are separated from the hot or boiling water. At this point, the chunks can be rinsed and after drying are cohesive, porous, bland, storable, appetizing in appearance and quick and easy to cook or prepare for consumption. When subsequently hydrated in boiling water for a few minutes or in hot water, the chunks are chewable, bland, light colored, meat-like in texture and palatable. The resultant food is extremely high in protein content.

25 Claims, 6 Drawing Figures

HIGH-PROTEIN QUICK COOKING MEAT-LIKE FOOD MADE FROM PLANT PROTEIN MATERIALS

This is a division of application Ser. No. 275,957, filed July 28, 1972 which, in turn, is a continuation-in-part of Ser. No. 218,117, filed Jan. 17, 1972.

The present invention relates to the preparation of an edible, bland, high-protein composition derived from proteinaceous plant materials, such as soybeans, peanuts, and other legumes and nuts, which is a textured or meat-like material and bland when hydrated. This invention also provides novel production methods for producing such materials.

World protein supplies derived from animal and fish sources, while seeming extensive, are actually quite limited as compared to the world human population. Peoples in certain areas of the world suffer severely from protein deficiencies and a considerable amount of research has been directed to developing palatable, meat-like protein products from vegetable and plant sources. It is an object of this invention to help combat starvation and malnutrition and feed the hungry peoples of the world by providing a relatively simple, relatively inexpensive method for converting widely available non-meat proteinaceous materials such as soybeans, peanuts, sesame seeds, lentil beans, cotton seed, ground nuts and, in general, nuts and beans of any type containing a high percentage of protein, preferably as high as 30 to 40 percent into a palatable food product that is palatable when cooked and resembles animal meat or the meat of fowl.

Proteinaceous vegetable materials such as soybean meal have been used in animal and human foods before. In one general method the proteinaceous vegetable material is extruded and spun into fibers which are formed into pieces or bundles by a suitable binder material thus forming meat-like chunks. In another general method the proteinaceous vegetable material is extruded and expanded to form a meat-like product when hydrated in boiling water. In another general method the proteinaceous vegetable material is de-oiled, compacted, broken into chunks, impregnated with oil and hydrated to form meat-like chunks. These prior methods suffer from the disadvantages of requiring costly and intricate processing, and/or of producing products of inferior cohesiveness, inferior texture and/or inferior palatability.

This invention involves a relatively simple and inexpensive method of preparing high protein food products which are dry, cohesive, porous, bland, storable, appetizing in appearance, and easy to cook or prepare for consumption and which are palatable, light-colored, meat-like in texture, chewable chunks when substantially or completely hydrated. The term cohesive means, among other things, that no binder is necessary. The term bland means that no objectionable tastes (e.g., soya tastes) remain. The term palatable applies to the hydrated chunks per se but usually applies when additives have been added to make it more palatable or more appetizing. The dry food products of this invention are bite-size chunks which are characterized by an improved rate of hydration to provide, bland, palatable, meat-like chewable chunks as compared to the relatively slow rates of hydration characterizing similar dry chunks provided by prior art methods such as that disclosed in Levinson U.S. Pat. No. 2,162,729 and Hoffman U.S. Pat. Nos. 3,485,636 and 3,620,755. The dry chunks can have any size but flour size and smaller, although the size usually ranges up to about one inch. This invention also provides a method for concentrating the protein content in a textural food unit. The dry food products of this invention are characterized by considerably less or no beany or nut-like flavor as compared to food chunks prepared by prior art methods and are further characterized by an improved texture without the need of texturizing agents such as edible oils (although such may be used for flavoring and/or nutritional purposes).

The drawings are explained in further detail hereinafter.

This invention is eminently suited for the conversion of soybeans to chunks which are meat-like upon hydration and much of the description given hereinafter refers to soybeans. Nevertheless, in place of part or all of the soybean there can be substituted proteinaceous plant or vegetable materials containing high amounts of protein (e.g. up to 30 or 40 percent or higher or lower) such as nuts, including peanuts, beans including lentil and mung beans, seeds such as rapeseed, cotton seed, sesame seeds and the like and substantially any type of legume, bean, nut or other plant or vegetable material (e.g., alfalfa or millet) having a high protein content or mixtures of same.

The several varieties of soybeans, e.g., Lincoln soybeans, etc. are useful in this invention. Soybeans and other proteinaceous plant materials contain small amounts of enzymes, for example, urease and lipoxidase, and inhibitors, such as hemaglutin and antitrypsins. All are inactivated by the moist heat used in the processing steps herein. Also, the proteinaceous plant (soybean) material used herein usually contains such proteins as arginine, histidine, lysine, tyrosine, tryptophane, phenylalanine, threonine, methionine, cystine, leucine, isoleucine, valine, glycine, and/or glutamic acid. The primary protein of soybean is glycinin, which is a mixture of short and long molecules made up in part of various amino acids. The soybean material also contain carbohydrates, ash, fibrous and pulpy constituents and associated flavoring ingredients.

The soybeans are usually processed to prepare soybean meal by the following sequence of steps, all of which are within the skill of those ordinarily skilled in the art; magnetic separation; bean cleaning; bean cracking (cracking rolls); dehulling, but the hulls can then be used as part of the feed; tempering, flaking; oil-extraction; and grinding. (Hulled or dehulled soybeans can be used in this invention. Also, defatted or full-fat soybean flour can be used as feed in this invention). The soybeans used as feed in the screw press are first conventionally particulated into meal, grits, flour, flakes or similar material, and the particulated material is conventionally processed using conventional solvent-extraction schemes to remove the oil. The most frequently used solvent is hexane, but examples of other volatile, nonpolar, oil solvents which can be used are pentane, heptane and benzene. Also, mixed solvents can be used, such as volatile, nonpolar, oil solvents, 1 to 10 percent water and volatile, polar organic solvents, such as acetone, the lower alcohols (like methanol, ethanol and propanol).

The particulated material is desolventized and/or deodorized by known techniques involving the application of heat, the degree of which affects the protein solubility range usually expressed in NSI or PDI, respectively, Nitrogen Solubility Index and Protein Dispersability Index (AOCS Test BA 10–65) which are standard tests of the American Oil Chemists Society. A suitable range of NSI for the particulated material used herein extends from about 30 to about 70, preferably 45 to 60. Too low of an NSI or PDI provides a mass which is too loose for suitable compaction and leaching and too high of an NSI result in a highly compacted chunk which is relatively difficult to hydrate and/or rehydrate.

The particulated material (preferably flakes) which contains some moisture, is then subjected to a pressure of at least 1,800 pounds per square inch for a time and at a temperature sufficient to convert moisture into steam. The material is partially disembittered, toasted without scorching, and compacted into a hard and substantially fused mass.

The pressure used is at least 1800 p.s.i., generally between about 2000 and about 5000 p.s.i. and preferably between about 2000 and about 3000 p.s.i. (The vast majority of the oil has been already removed from the soybean, so usually less than one percent by weight of oil remains in the soybean feed.) One reason why pressures between 2000 and 3000 pounds per square inch are preferred is that less energy is generated which results in less chance of scorching the product. Pressures below those specified result in chunks that are too loosely compacted, require extremely long times to achieve any degree of disembittering. Pressures in the above range result in a compacting and plasticizing of the material whereby a cake is formed in which the dust and any hulls are uniformly combined with the rest of the material. The plasticizing action during the pressure and heat treatment causes the cake to be substantially uniform, in which the fines and hulls are intimately held. The cake can therefore be fragmented into chunks which remain cohesive enough to be a commercial product even though subjected to boiling water and hot air. The porosity in the final chunks is believed to be very important to the quick re-hydration of the chunks to provide the final meat-like product.

The hydration properties of the chunks of this invention can be controlled by controlling the compaction process. In general, the higher the degree of compaction, the slower the rate of hydration. The reverse is also true. (Rehydration times can be controlled to a degree by the same variable.)

Insufficient compaction, e.g., at pressures below about 1800 p.s.i., or too low protein solubility, produce chunks that tend to form a mush or gruel upon hydration.

The moisture content of the material should be between about 5 and about 10 percent when it is fed into the equipment wherein it will be subjected to at least 1800 pounds per square inch. The reason for this is that that much moisture is necessary to obtain partial or substantial disembittering by steaming in such equipment (i.e., the moisture is converted therein into steam). If too much moisture is present, scorching of the product will occur or uneven toasting will result. If the moisture content of the soybean material is too high, the portions of the meal away from the source of the heat will not be toasted, or if sufficient heat and pressure are applied to toast the portions away from the source of heat, those portions in juxtaposition to the source of heat will be scorched or burned.

The period of time of processing the soybean material at the stated pressure is normally between about 1.5 and about 5 minutes to obtain the desired results. Preferably the time period is 3 minutes.

The soybean material can be treated by any conventional means which will produce the desired results. For example, a press plate having heated plates can be used.

The desired results are preferably obtained by the use of a modification of a screw press of the type disclosed in U.S. Pat. No. 731,737 (incorporated herein by reference) and costumarily referred to in the art as an "Anderson expeller". The outer casing surrounding the screw does not contain the series of holes, as for example the oil has already been removed from the particulate soybean feed by an appropriate method. The modified Anderson expeller includes a preconditioning chamber which is, for example a 14 inch wide by 14 feet long steamjacketed continous ribbon blender. Next in the process line is a vertical force feeder which conveys the particulate soybean material to the main horizontal pressing chamber. The main horizontal pressing chamber has been modified by replacing the barrel spacing bars with solid polished plates. Also the main press worm (screw) has been modified by sliding a tapered cone along the shaft into the pressed cake outlet space to increase the internal pressure along the press worm and to obtain uniform, thin, compacted material (usually about three-eighth inch thick). All internal surfaces of the press subjected to contact with the soy material or compacted material are hardened and highly polished for smooth flow of the material through the press.

The press is normally set so that the thickness of the resulting cake (mass) is about one-fourth to three-eighth inch, but this thickness is not critical and is only desirable.

The screw press can be modified by the addition of heating coils around the outer wall of the screw press casing housing the rotable screw as to uniformly heat the casing in such regions. This is normally not done when the soybean particles have been preheated in a preconditioning chamber. (Any other heating arrangement can be used).

The desired temperature of the soybean material during the pressing is about 150° to about 200°C. (about 302° to about 392°F.), so the inner casing wall should not have a temperature which will cause the temperature of the soybean material to rise above about 200°C. or else the soybean material will become scorched. The pressure in the press will convert the moisture into steam, but not all of the energy produced will be used in vaporizing the moisture — some will go to generally raising the temperature of the soybean material. If properly done within the limits set forth herein the resulting cake (mass) will not be scorched. Some degree of disembittering is obtained by the steam thusly produced, but the cake (mass) still has a degree of bitterness or beany flavor and has a nutty flavor. The look, taste, chewability, blandness, meatlike texture and general characteristics of a meat-like product have not been obtained at this point in the processing of the soybeans.

As previously stated, the temperature of the soybean material should be between about 150° and about 200°C., and preferably 165° to 180°C. This assures partial or substantial disembitterment without scorching. The soybean material can be preheated, before being fed into the pressure-treated equipment, to a temperature between about 160° and 200°F. Soybean material which contains too high of a moisture content can be preheated and dried to the proper moisture content in a tempering chamber before being fed into the pressure equipment. When equipment like a press plate having heated plates is used, the soybean material is first placed therein and allowed to stand in order to preheat the material.

The mass obtained from the screw press or other equivalent processing equipment is fragmented by any convenient means. Examples of such means are chopping blades and crushers. The resulting chunks are sized so that they have a more uniform size range. For example, four suitable portions of different but individually uniform size ranges include chunks that:

| Pass through a screen having openings of | But are retained on a screen having openings of |
|---|---|
| 1 inch | ½ inch |
| ½ inch | No. 4* |
| No. 4* | No. 10* |
| No. 8* | No. 20* |

*U.S. Mesh sizes

Preferred chunks pass through a 1 inch opening screen and stay on a one-half inch opening screen. The over and under sized material can be removed. The resulting chunks are light yellowish brown or buff in color and are relatively nonporous.

The chunks are then cooked in boiling water or hot water for a period of time selected in accordance with the mean size of chunks and sufficient in length to hydrate the chunks to a substantial extent, preferably completely, and to dissolve out some of the soluble constituents whereby the chunks are softened. The boiling water is usually under atmospheric pressure, although a lower or higher pressure can be used. The use of pressures above atmospheric produce chunks which are darker in color and have a poorer consistency. When hot water is used, it should have a temperature of at least 150°F. and preferably a temperature between 190° and 212°F. The use of the higher temperature levels assures that a bactericidal processing is achieved. Other solvents or mixtures of same can be employed in partial or total replacement of water for purposes of leaching the chunks. The chunks are cooked or leached as long as necessary, which is often between about 1¼ and about 1½ hours, for example, for chunks of a size of about one inch. The chunks can be cooked much longer than the time necessary to completely hydrate them (e.g. up to 1¾ hours or more) without the chunks becoming mushy and losing their integrity. The amount of water used is not narrowly critical and should be that minimum amount to cover the chunks during cooking. There is no technical upper limit except one of economics in providing excessive amounts of hot or boiling water. Illustratively, water to chunks ratios can be 6:1 or lower to 9:1 or higher.

Figure 1:
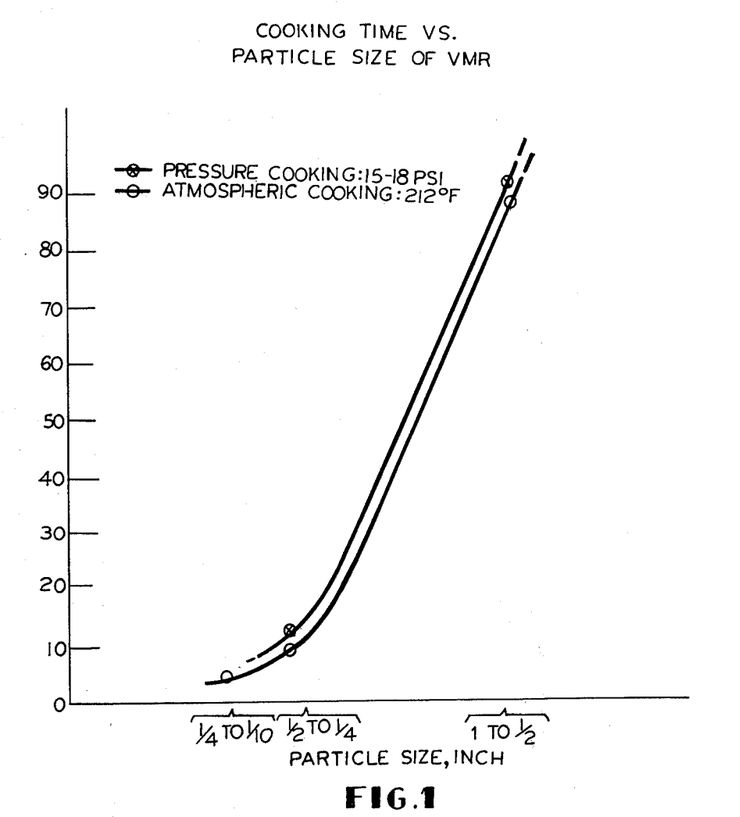
FIG. 1 is a graph of the cooking time vs. the particle size of the soybean chunks being hydrated.

FIG. 1 demonstrates (i) the relationship between cooking (hydration) time and particle (chunk) size at a particular cooking temperature and pressure, and (ii) the advantage of using atmospheric cooking (hydration) pressure. The procedure of Example 1 was used to produce chunks which passed through a 1 inch screen and were retained on a one-half inch screen which is a preferred size. The cooking time at 212°F. (atmospheric pressure) was shorter than the cooking time at pressures of 15 to 18 p.s.i.g. The resultant rehydrated chunks were lighter and had a better consistency when they were cooked at atmospheric pressure. The procedure was repeated for chunks which passed through a one-half inch screen and were retained on a one-fourth inch screen. Similar results were obtained. In each instance the rehydration was done using a water to chunk ratio of 2:1.

The pH range of the hot water or boiling water is quite wide, usually between about 5 and about 10, preferably between 6 and 7 and most preferably, as close to neutral as possible. Tap water usually has a pH of 6 to 7, so an acid or base must be added to achieve other pH's. The use of a pH above about 10 tends to produce off-flavors and aromas. Any pH adjusting agent can be used which can be used in foods and includes acids, alkalies, acidulants, buffers and neutralizers. Examples of inorganic acids which can be used to adjust the pH to the desired level are phosphoric acid, sulfurous acid, sulfuric acid, carbonic acid and hydrochloric acid, and an example of other acidifying materials which can be used for the same purpose are alum. Examples of organic acids which can be used are acetic acid, tartaric acid, malic acid, citric acid, formic acid, lactic acid and benzoic acid. Fatty acids can be used. The preferred fatty acids are the food additive fatty acids, which are one or any mixture of straight-chain monobasic fatty acids manufactured from fats and oils derived from edible sources. Examples of the preferred fatty acids are capric acid, caprylic acid, lauric acid, myristic acid, oleic acid, palmitic acid and stearic acid. One or any mixture of two or more of the aluminum, calcium, magnesium, potassium and sodium salts of the above preferred fatty acids can be used. Examples of bases which can be used are sodium hydroxide, sodium carbonate, ammonia, potassium hydroxide, sodium bicarbonate, calcium carbonate, ferrous hydroxide, sodium sesquicarbonate and trisodium phosphate. The pH can be adjusted by the addition of natural foods or extracts thereof, which would flavor the end product, but will not be likely to reduce the shelf life of the end product. The pH can be adjusted by the addition of wines (which are acidic) or other similar alcoholic beverages, which will flavor the end product. The end product flavored by wines, can be re-hydrated and served with a meat sauce to give an excellent-tasting, quick-serving artificial meat dish. The agents used to adjust the pH should be those which can be used in materials (subject to further processing) which can be consumed by man and/or animal as food.

The cooked chunks are removed from the hot or boiling water and preferably washed with warm water. Normally the cooked chunks are removed from the hot or boiling water by pouring the mass onto a screen which is of a mesh which retains the chunks. An appropriate screen would be one having one-eighth inch openings. The temperature of the warm wash water, if used, is usually between about 130° to about 160°F.

Abundant amounts of warm water should be used. (The extraction or leaching or washing can be achieved using water having a temperature as low as 32°F., but warm water is preferably used because it is more efficient. Also, the washing can be done using boiling water and hot water having temperatures up to 212°F.) The length of the washing time depends on the batch size. Illustratively, it varies from 1 minute or less to 2 or 5 minutes or more. The object of washing is to remove substantially all solubles and any water to chunk ratio needed to accomplish this can be used, illustratively 6:1 or less to 9:1 or more. The washing step can be a batch or a continuous scheme and preferably is at atmospheric pressure. The washed chunks should be allowed to drain after washing, with or without agitation. The moisture content of the cooked chunks at this point in the process is usually about 65 to about 75 percent by weight. The steps involving water apparently remove some water-soluble components which are responsible for some of the undesirable bitter and beany taste, and the odor, and are also responsible for the final porosity and texture of the dry product.

The cooked chunks are then dried to a low moisture content, preferably to about 4 to 7 percent by weight final moisture content. The drying is preferably achieved using dry air having a temperature between 150° and 250°F., usually about 200°F. The dry air should have a low relative humidity, e.g., 30 percent, for an efficient drying operation. The magnitude of the drying time is in the order of 2 to 4 hours, depending on the batch size. A continuous drying scheme can be utilized. Any suitable drying method can be used, for example, vacuum drying or freeze drying. After drying, the average yield of solids for the entire process is about 75 percent by weight. The chunks, at this stage, have an increased protein content of about 8 to 10 percent by weight (on a dry basis) as compared to the chunks which have not yet been subjected to the cooking (boiling or hot water), washing and drying steps. This increased protein content probably is one of the reasons why the hydrated chunks of this invention are more meat-like in texture than the hydrated chunks of the prior art. The resulting chunks are golden brown in color, which is most appetizing in appearance, are relatively porous, which probably is one of the reasons why the chunks of this invention can be hydrated in 10 to 15 minutes by the consumer, or for pet or animal consumption bland, dry, cohesive, storable, quick-cooking and, upon substantial or complete hydration, are chewable, lightcolored, meat-like in texture, bland and palatable.

(Typically the moisture content of the compacted chunks is between 6 and 8 percent while the moisture content of the dried processed chunks is between 4 and 6 percent. Both types of chunks usually have a pH of 6 to 7.)

The chunks can be stored for extended periods of time in the absence of moisture or very high humidity, and can be stored almost indefinitely if packaged. Clear packages can be used because the chunks are golden brown and are very appetizing in appearance.

Figure 2:
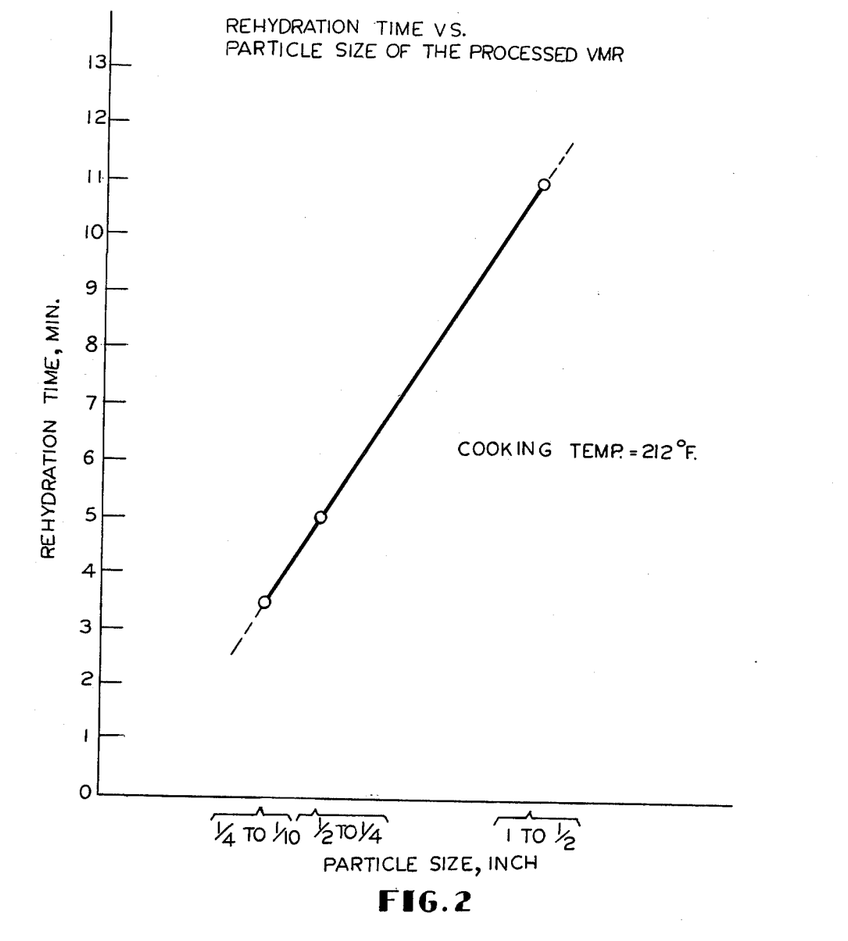
FIG. 2 is a graph of the rehydration time vs. the particle size of the processed, dry soybean chunks

The chunks can be used as a meat substitute by placing the chunks in boiling water for about 5 to 15 minutes or in hot water (preferably 190° to 212°C.) for 10 to 15 minutes. The chunks are hydrated to a moisture content of about 65 to about 75 percent by weight. The rehydration time depends upon the particle (chunk) size and water temperature. The same is true at the various pressures at which cooking can be achieved. FIG. 2 illustrates the variation of rehydration time with particle (chunk) size at a cooking temperature of 212°F. The procedure of Example 1 was used to produce chunks having a particle size between one-tenth and one-fourth inch - those chunks rehydrated in 3.5 minutes. The procedure of Example 1 was used to produce chunks of a size between one-fourth and one-half inch and those chunks rehydrated in 5 minutes. The procedure of Example 1 was used to produce chunks of one-half to 1 inch and those chunks rehydrated in 11 minutes. In each instance the rehydration was done using a water to chunk ratio of 2:1. The resultant straight line relationship is illustrated in FIG. 2. The chunks when substantially or completely hydrated, are bland, meat-like in texture, light colored, chewable palatable, cohesive and good tasting. Prior art soybean concentrates and products are not bland because all of the soybean components which cause an objectionable soybean taste have not been completely removed. The water to solids ratio can be varied to obtain textural difference in and for particular applications. The usual weight ratio of water to solids varies from 3:1 to 1:1 with 3:1 being preferred. (In the rehydration of the prior art chunks, since the rehydration times are long, evaporation of water will occur during cooking so provision must be made to add make-up water during cooking. This is not a problem with this invention due to the short rehydration times.)

As a variation of this invention flavoring systems including flavor enhancers and/or agents can be added, but are usually not needed. Usually the flavor enhancers are added in an amount of 0.1 to 2 percent by weight. Examples of flavor enhancers are monosodium glutamate, disodium inosinate and disodium guanylate. Flavoring agent in the usual amount of 10 to 20 percent by weight can be added.

The only function of cooking is to hydrate the chunks to prepare them for serving. Long term cooking might eventually destroy the protein. There is no maximum cooking temperature in the sense that some upper temperature must be avoided so as not to deactivate the protein because the chunks which are cooked already have denatured protein. The formation of the chunks using a modified "Anderson expeller" plasticizes and denatures some of the protein. The denatured protein is not "active" and is not water soluble. The product produced by U.S. Pat. No. 2,162,729 has a basic structure or matrix which differs from that of this invention. This invention utilizes thermoplastic compaction (preferably with sizing or grading) and water extraction to obtain its characteristic structure. The chunks of this invention are made porous by dissolving out carbohydrates, ash, soluble minerals and parts of the fibers. The denatured protein is not soluble. The basic compacted structure is set or fixed in the expeller; then the porous structure is obtained by water extraction and is further or finally fixed by the drying step.

The hydration properties of the chunks of this invention can be controlled by controlling the degree of compaction. In general the higher the degree of compaction, the slower the rate of hydration. The reverse is also true. The dehydrated chunks are relatively porous, which causes a significant decrease in the rehydration time. This is achieved without the use of fiber spinning or extrusion-cooking or expanding.

The chunks (of the same size) resulting from the process of U.S. Pat. No. 2,162,729 (applicant has found) require about 1¼ to 1½ hours in boiling water to reach the desired level of hydration and still provide a beany taste. The fast rehydration times are due in part to the relatively porous chunks of this invention. The oiled and flavored chunks (of the same size) require at least 1½ to 2 hours to completely hydrate to the desired level. Rehydration rate of the chunks of this invention is vastly superior to those of the prior art. Rehydrated chunks are obtained which have far less of a beany or other disagreeable flavor (almost non-detectable) than those of the prior art. This invention presents a vastly improved product by an unexpected process for concentrating the protein content of soybeans into a cohesive, textural unit. The resultant textured vegetable protein food has a higher protein content than most textured vegetable protein foods produced by the prior art. Even more importantly, the various heating steps in the process of this invention greatly increase the relative protein efficiency of the resultant textured food over the initial starting material and destroys certain growth inhibitors in the soybean or other proteinaceous feed material.

The product of this invention does not have to use chemically treated flours, which is important to consumers who do not want foods which have been chemically treated. Along the same line, the pH used in treating the chunks with hot or boiling water does not have to be adjusted by the use of any pH adjusting agent if so desired.

The dry and hydrated products of this invention are cohesive, meat-like in texture chunks which do not require a binder. The chunks are not fibrous in taste or chew, although they are a textured vegetable protein resembling the fibrous structure of natural meats. The hydrated chunks are therefore able to and do have a texture similar to natural meat. The meat-like texture of the chunks is aided by the fact that it is not (but can be) coated or impregnated by an edible oleaginous material after the drying step.

The chunks of the invention can be rehydrated for consumption or can be used as a raw material that is, for example, oiled and flavored and treated according to the method described in U.S. Pat. No. 3,485,636.

The dried chunk of this invention can be used in endless varieties of ways to furnish vegetable protein as a meat protein substitute. The dried chunks can be rehydrated and eaten cold or hot (preferred). The dried chunks can be rehydrated, mixed with other food ingredients, flavor enhancers and other edible ingredients, and eaten, cold or hot (preferred). The dried chunks of this invention can be mixed with some or all of the above-described ingredients, rehydrated and eaten cold or hot (preferred).

The dried chunks of this invention can be used to produce products which simulate beef, veal, liver, mutton, ham, turkey and chicken as dehydrated, canned or frozen materials. The dehydrated product is usually supplied in multiwall bags or fiber drums and hydrated products are usually supplied in cans or frozen packages. As a general guideline, the dry product requires rehydration on the customers part and additional processing for finished products by commercial facilities. The rehydration product in a frozen form is ready to use upon thawing and is especially recommended for institutional use. The rehydrated product in a canned form is ready to use and is recommended for institutions with limited kitchen facilities. All of the meat-like products normally use a simple rehydration step to place them in shape for consumption. This step can be done by the consumer, or the step can be achieved before the consumer receives the end product. The following illustrates the variety of ways in which the product of this invention can be used. After being rehydrated, the chunks of this invention retain their meat-like textural integrity during frying, grilling, baking or retorting. The rehydrated chunks weigh 2 to 3 times that of the dry material and in the rehydrated form readily mix with ground meat, rice, corn meal or almost any other protein enrichment. The rehydrated chunks and formulations using them can be flavored in a processing step or can be left unflavored for subsequent customer processing. Also they can be precooked and dried, frozen or canned as a ready-to-use product. Rehydration can be achieved by heating sealed cans of the chunks, water and other ingredients.

The following foods are illustrative of foods in which the rehydrated chunks of this invention can be used in small and large portions: beef burgundy, hamburgers (seasoned and unseasoned), pizza burgers, beef stew, other meat stews, beef stroganoff, barbecued beef, meat loaf (with and without gravy), veal parmesan, veal cutlet (breaded and otherwise), meat balls, meat balls in spaghetti sauce, Swedish meat balls, breaded filets, gravies (chicken, brown, beef etc.), sauces (barbecue, etc.), stuffings (turkey, meat, bread, etc.), cocktail franks, spaghetti sauce, spago's with meatballs, shrimp fried rice, chicken chow mein, tamales, chicken a-la king, chicken fricassee, Manhatten clam chowder, New England clam chowder, chili, ravioli, sloppy Joe, beef gravy, chicken salad, fried clams, clam sticks, fish sticks, shrimp cakes, shrimp marinara, stuffing, soup (dehydrated), baby meat foods, pet foods, hot gravies for pet foods, etc. In each of the above illustrative foods, the meat itself can be replaced in part or in toto by the rehydrated chunks of this invention. Usually a flavoring agent and/or enhancer is used.

A very important feature of this invention is that the dried processed chunks or the rehydrated chunks can withstand the usual retorting conditions for canned products (i.e., 250°F., for 1 hour).

Unless otherwise stated or indicated in the following examples and throughout the rest of the specification and in the claims, all percentages, parts and portions are expressed on a weight basis, based upon total compositions. The following examples further illustrate but do not limit this invention.

EXAMPLE 1

The starting material is flakes of dehulled, solvent-extracted, soybean having a moisture content of 7.5 percent and an N.S.I. of about 50 percent. The soybean flakes are processed in a "modified Anderson expeller" as described above.

The soybean flakes are preheated to about 180°F. in the preconditioning chamber. The retention time in the preconditioning chamber is 1 minute, and steam having a pressure of 65 p.s.i.g. is used in the steam jacket. The soybean flakes have a moisture content of 6.8 percent upon exiting from the preconditioning chamber and are passed through the vertical force feeder into the main horizontal pressing chamber. The processing retention time (time during which the pressure is applied) is 2 minutes; the pressure applied is 2000 p.s.i. and the thickness of the cake is about three-eighths inch. The cake during the pressing has a temperature of 305°F. The exiting cake has a moisture content of 5.5 percent, is allowed to cool and is fragmented by means of chopping blades into chunks. The chunks have a light yellowish brown or buff color and are not porous in appearance.

The chunks are separated by screens to give retained chunks having a chunks size that pass through a one inch screen and stay on a one-half inch screen. The feed chunks (compacted chunks) have an analysis (weight percent on a dry basis) as follows:

TABLE I

|  | Compacted Chunks | Final Chunks |
| --- | --- | --- |
| Protein (N×6.25) | 53.5 | 61.5 |
| Fat | 1.2 | 3.3 |
| Fiber | 4.0 | 3.0 |
| Ash | 6.7 | 5.2 |
| Carbohydrate (difference) | 34.6 | 27.0 |

The noted calculation basis for the protein is N×6.25, wherein N is the value obtained by an analysis for protein nitrogen using the Kjeldahl Test and 6.25 is the standard factor for soy to get total protein.

The following is the amino acid profile for the compacted soybean chunks:

| AMINO ACID | PERCENT |
| --- | --- |
| Lysine | 4.798 |
| Available Lysine | 4.421 |
| Histidine | 2.016 |
| Arginine | 5.664 |
| Aspartic Acid | 9.142 |
| Threonine | 2.882 |
| Serine | 3.977 |
| Glutamic Acid | 14.230 |
| Proline | 3.996 |
| Glycine | 3.293 |
| Alanine | 3.546 |
| Cystine, Half | Trace |
| Valine | 3.038 |
| Methionine | 1.281 |
| Isoleucine | 2.732 |
| Leucine | 4.858 |
| Tyrosine | 2.455 |
| Phenylalanine | 3.614 |

The following is the vitamin analysis for the compacted soybean chunks:

| VITAMINS | AMOUNTS |
| --- | --- |
| Thiamin | 3.49 mgs per lb. |
| Riboflavin | 2.18 mgs per lb. |
| Niacin | 8.17 mgs per lb. |
| Vitamin $B_6$ | 2.27 mgs per lb. |
| Vitamin $B_{12}$ | None detected |

The Protein Efficiency Ratio of the compacted chunks is 87 percent of that for casein.

The following is the mineral analysis for the compacted soybean chunks:

| MINERAL | AMOUNT |
| --- | --- |
| Calcium | 0.216 percent |
| Phosphorous | 0.660 percent |

-Continued

| MINERAL | AMOUNT |
| --- | --- |
| Potassium | 0.230 percent |
| Magnesium | 0.280 percent |
| Iron | 90.5 ppm |
| Copper | 15.0 ppm |
| Manganese | 20.0 ppm |
| Zinc | 81.0 ppm |
| Sodium Chloride | 0.222 percent |
| Cobalt | 0.033 ppm |
| Iodine | Less than 0.14 ppm. |

225 pounds of water (pH is 6.8) are placed in a steam jacketed Groen tilting kettle and the water is brought up to a temperature of 212° F. (vigorously boiling). 25 pounds of the above mentioned feed chunks are placed in boiling water and the chunks are cooked at that temperature (vigorously boiling) for 1.5 hour. The cooked chunks are drained by tilting the kettle and dumping the cooked chunks on a one-eighth inch opening screen. The cooked chunks on the screen are washed with warm water (150°F). Approximately 300 pounds of warm water are used to wash the cooked chunks over a period of 15 minutes. The cooked chunks are drained and have a moisture content of 75 percent by weight. The cooked chunks are then placed on a one-eighth inch openings screens in a Proctor and Schwartz cabinet dryer. The bed depths are about one inch, and the dryer screen area is 4.28 square feet. Air, having a temperature of 200°F. and a relative humidity of 30 percent, is used to dry the chunks to a final moisture of 5 percent by passing the air upwardly through the cooked chunks for 2½ hours at a velocity of 500 feet per minute. The average yield of solids for the entire process after drying is 75 percent. The final chunks have an analysis (weight percent on a dry basis) as given above in Table I.

Comparison of this analysis of the dry chunks prepared according to this invention with the analysis set forth hereinabove for the feed chunks (compacted chunks) shows that the chunks according to this invention possess a protein content which is 8 percent higher (based on the protein content of the feed chunks) than the feed chunks.

The following is the vitamin analysis for the dried processed chunks:

| Thiamin | 2.62 mgs per lb. |
| --- | --- |
| Riboflavin | 1.07 mgs per lb. |
| Niacin | 7.19 mgs per lb. |
| Vitamin $B_6$ | 0.62 mgs per lb. |
| Vitamin $B_{12}$ | None detected. |

This shows that a very high percentage of vitamins is retained. A mineral analysis of the dried processed chunks shows 0.25 percent magnesium. This shows that a very high percentage of minerals is retained.

One part of chunks is placed in 2 parts of boiling water for 11 minutes. (The chunks can absorb from 1 to 3 times their weight of water). The resultant hydrated chunks are bland, light-colored, meat-like in texture and palatable. They do not contain any noticeable bitter beany flavor and taste. Further, there is no objectional odor when any storage package is opened, during the rehydration or at any time thereafter. The rehydrated chunks are very high in protein content. The rehydrated chunks have improved Texturometer cohesiveness over hydrated chunks produced by the method of U.S. Pat. No. 2,162,729. The rehydrated chunks have improved texture over known hydrated chunks. The cooking time to rehydrate the chunks of this invention is much shorter than those needed to hydrate the chunks of U.S. Pat. Nos. 2,162,729; 3,485,636 and 3,620,755.

EXAMPLE 2

Example 1 is repeated except that the chunks are placed in plastic bags, sealed and stored at about room temperature, and then they are removed from the bags for the rehydration step.

In each of Examples 3, 4, 6, 7, and 9 through 24 the chunks after rehydration at atmospheric pressure are bland, light-colored, meat-like in texture and palatable. They do not contain any noticeable bitter beany flavor and taste. Further there is no objectional odor when the storage package is opened, during the rehydration or at any time thereafter. The rehydrated chunks are very high in protein content and have an excellent meat-like texture. The cooking time to rehydrate the chunks is much shorter than those needed to hydrate known chunks.

EXAMPLE 3

Example 2 is repeated, except that the conditions in the main horizontal processing chamber are changed. The processing retention time (time during which the pressure is applied) in the chamber is 3 minutes; the pressure applied is 2500 p.s.i. and the thickness of the cake is about one-fourth inch.

EXAMPLE 4

Example 2 is repeated, except that the compacted chunks that are used are those that pass through a one-half inch screen and are retained on a one-fourth inch screen. The chunks are completely cooked (hydrated) in 10 minutes at a cooking temperature of 212°F. and at atmospheric pressure.

EXAMPLE 5

Example 2 is repeated, except that the compacted chunks that are used are those that pass through a one-half inch screen and are retained on a one-fourth inch screen. The chunks are completely cooked (hydrated) in 12.5 minutes at a cooking pressure of 15 to 18 p.s.i. The resultant rehydrated chunks are bland, palatable and meat-like in texture, but are darker in color than and have a poorer consistency than the chunks hydrated at 212°F. and atmospheric pressure. These examples show that there is no advantage to using cooking (hydration) pressures above atmospheric (i.e., pressure cooking) in that the hydration time is increased and the product is not as good.

EXAMPLE 6

Example 2 is repeated, except that the compacted chunks that are used are those that pass through a one-fourth inch screen and are retained on a one-tenth inch screen. The chunks are completely cooked (hydrated) in 5 minutes at a cooking temperature of 212°F. and at atmospheric pressure.

EXAMPLES 7 AND 8

Example 2 is repeated, except that the compacted chunks that are used are those that pass through a 1 inch screen and are retained on a one-half inch screen. The chunks are completely cooked (hydrated) in 90 minutes at a cooking temperature of 212°F. and at atmospheric pressure.

Example 2 is repeated, except that the compacted chunks that are used are those that pass through a 1 inch screen and are retained on a 1.2 inch screen. The chunks are completely cooked (hydrated) in 92.5 minutes at a cooking pressure of 15 to 18 p.s.i. The resultant rehydrated chunks are bland, palatable and meat-like in texture, but are darker in color than and have a poorer consistency than the chunks hydrated at 212°F. and atmospheric pressure. These examples show that there is no advantage to using cooking (hydration) pressures above atmospheric (i.e., pressure cooking) in that the hydration time is increased and the product is not as good.

EXAMPLE 9

Example 2 is repeated, except that the compacted chunks used are those that pass through a one-half inch screen and are retained on a one-tenth inch screen. The chunks are rehydrated in 3.5 minutes at a temperature of 212°F.

EXAMPLES 10 AND 11

Example 2 is repeated, except that the compacted chunks used are those that pass through a one-half inch screen and are retained on a one-fourth inch screen. The chunks are rehydrated in 5 minutes at a temperature of 212°F.

The above example is repeated using compacted chunks that pass through a 1 inch screen and are retained on a one-half inch screen. The chunks are rehydrated in 11 minutes at a temperature of 212°F. A similar excellent product resulted.

EXAMPLES 12 TO 14

Example 2 is repeated three times, except that the soybean flake (feed) is replaced with soybean grits, soybean flour and soybean meal, respectively.

EXAMPLE 15

Example 2 is repeated except that the soybean flakes (feed) is not pretreated (tempered) in the preconditioning chamber. The soybean flakes, after tempering, has a temperature of 95°C. when it is fed into the Anderson expeller.

EXAMPLES 16 AND 17

Example 2 is repeated twice using soybean meal, having a moisture content of 5 and 8.5 percent, respectively, as the feed for the "Anderson expeller".

EXAMPLE 18

Example 2 is repeated except that the soybean meal feed has a moisture content of 7.5 percent by weight (the feed has been pretreated in the preconditioning chamber to reduce the moisture content from 8.5 percent by weight and has a temperature of 85°C. when fed into the Anderson expeller), that a pressure of 5000 p.s.i. is used in the Anderson expeller, that the retention or processing time in the pressure area of the Anderson expeller is 2 minutes.

EXAMPLE 19

Example 2 is repeated except that the soybean flakes (feed) contains a nonsoluble coloring agent.

EXAMPLE 20

Example 2 is repeated except that the temperature in the Groen tilting kettle is maintained at 190°F. for 1.5 hours.

EXAMPLE 21

Example 2 is repeated except that the pH of the water used in the kettle is adjusted to 5 (using citric acid) before the chunks were boiled.

EXAMPLE 22

Example 2 is repeated except that the pH of the water used in the kettle is adjusted to 8.5 (using NaOH) before the chunks are boiled.

EXAMPLE 23

Example 2 is repeated except that the cooked chunks from the Groen tilting kettle are washed with water having a temperature of 135°F. for 10 minutes.

EXAMPLE 24

Example 2 is repeated except that the chunks taken out of the sealed package for use as a meat-like substitute are completely hydrated by placing the chunks in hot water (195°F.) for 14 minutes.

EXAMPLE 25

Example 2 is repeated through where the cake is fragmented into chunks. Then the chunks are placed in about 3 times their weight of water. The mixture is brought to boiling and boiled continuously for about 1¼ hours. The level of water is maintained during the boiling period by water additions. Example 2 is then continued through the drying of the chunks. Hot water (about 180°F.) is added to the chunks. Water, in an amount twice that of the weight of the chunks, is used. The mixture is intermittently stirred for 30 minutes, with no additional heating. The chunks absorb all of the water after the 30 minutes, which means that the chunks are rehydrated at a weight ratio (water to chunks) of 2:1.

EXAMPLE 26

Hydrated chunks are prepared as in Example 1, except that a non-soluble color is added during the rehydration step. 18 pounds of the hydrated colored soybean chunks (water to chunk ratio of 2:1) are braised. 48 pounds of beef gravy, 16 pounds of potatoes, 15 pounds of peas and carrots and 3 pounds of onions are mixed in a second kettle. The braised, hydrated, colored soybean chunks are added to the second kettle and mixed therein. The contents of the second kettle is heated to 185°F., and then placed in several containers. The containers are frozen and stored. After a period of time the containers are thawed and the beef stew is heated. The warm beef stew is delicious and has no objectionable soybean taste or odor. The soybean chunks have a meat-like texture.

EXAMPLE 27

Example 1 was repeated except that the compacted chunks were soaked in water at 35°F. for 3 days. A good product was obtained, but the danger of bacterial spoilage and the economical analysis show that the use of a temperature of at least 150°C. is desirable to achieve the hydration step.

EXAMPLE 28

Hydrated soybean chunks are prepared as in Example 1 (water to chunk ratio of 2:1). 300 pounds of the hydrated soybean chunks, 720 pounds of red kidney beans, 960 pounds of beef gravy, 120 pounds of tomato sauce, 20 pounds of chili powder and 10 pounds of salt are placed in a kettle and mixed. The kettle ingredients are heated to 185°F., and then canned. The cans are retorted at 250°F. for 1 hour, cooled and stored. After a period of time the cans are opened, placed in a large container and heated. The warm chili is delicious and has no objectionable soybean taste or odor. The soybean chunks has a meat-like texture.

EXAMPLE 29

A dry mix of Mexican Mac is prepared. 44 pounds of macaroni are placed in pouches. Dried, soybean chunks are prepared as in Example 1. 10 pounds of dried soybean chunks, 5 pounds of dehydrated green peppers, 8 pounds of beef bouillon powder, 3 pounds of onion powder, 16 pounds of tomato powder, 3 pounds of chili powder, 7 pounds of food starch, 7 pounds of sugar and 5 pounds of dehydrated tomato flakes are mixed and placed in pouches. The pouches are stored.

EXAMPLE 30

Rehydrated soybean chunks are prepared as in Example 1 (water to chunk ratio of 2:1), except that one-tenth inch chunks are used. 30 pounds of hydrated soybean chunks are mixed with 70 pounds of comminuted beef. The mixture is formed into patties. The patties are frozen and stored. The patties are cooked. The cooked patties are delicious and have no objectionable soybean taste or odor. The soybean chunks have a meat-like texture.

EXAMPLE 31

Several laboratory size experimental runs are made to evaluate the hydration of compacted chunks under pressure. The equipment includes a 2 cubic foot Adolph Johnson Steam Cooker and a 10 quart Fisher pressure sterilizer. Different processing conditions for each run were tried to obtain shorter hydration times than that for atmospheric cooking.

The procedure of a typical run includes:
Equipment: UL 10 qt. Fisher pressure sterilizer No. 1925 X
Steam Pressure: 18 p.s.i.g.
Cooking time: 1½ hours.

Two pounds of compacted soybean chunks (obtained as described in Example 1) are added to 18 lbs. of preboiled water in the open sterilizer. The sterilizer is closed and the mixture is subjected to pressure cooking by placing it over a gas fired burner. The mixture is kept at 18 p.s.i.g. for 1½ hours, then the container is removed from the burner. The pressure drops on cooling and the vessel is opened. Excess water is drained and the cooked chunks were washed with warm water. The pressure cooked chunks contain about 75 percent moisture, and they appeared to be a dark grayish color (much darker than the product obtained from atmospheric cooking). The surface appears to be mashed or finely grained in structure. The cooking time to reach equivalent moisture contents for both atmospheric and pressure cooking are about the same. The color of atmospherically cooked chunks are much lighter than the pressure cooked product. There is no significant difference detected in the flavor of both types of products. The mashed surface characteristics of the pressure cooked product is believed to be detrimental to product yield since more fines will result in subsequent processing.

EXAMPLE 32

Example 1 is repeated twice up to the rehydration step, except that the drying times of the hydrated chunks are 50 minutes and 4 hours, respectively. Also, the compacted chunks which are used pass through a three-fourth inch screen and are retained on a three-eighth inch screen. 50 grams of each batch of dried, processed chunks were rehydrated by placing each in 200 ml of boiling water for 15 minutes.

Texturometer tests are run having the tested material in a loosely packed single layer in the cup platform. Three samples of each batch of hydrated chunks are tested, five trials being run on each sample. Rehydrated chunks A are those cooked (hydrated) for 50 mins., and rehydrated chunks B are those cooked for 4 hours. The data from the texturometer tests is:

| SAMPLE NO. AND DATA HEADINGS | | AVERAGE COHESIVE VALUES REHYDRATED CHUNKS A | REHYDRATED CHUNKS B |
|---|---|---|---|
| Sample No. 1 | | | |
| | x | 0.760 | 0.688 |
| | SD | 0.095 | 0.080 |
| Sample No. 2 | | | |
| | x | 0.734 | 0.694 |
| | SD | 0.027 | 0.028 |
| Sample No. 3 | | | |
| | x | 0.716 | 0.652 |
| | SD | 0.040 | 0.045 |

Fifteen trials are reported above for each batch of chunks. Rehydrated chunks A are consistently slightly more cohesive than rehydrated chunks B that is, the slightly more cohesive rehydrated chunks are the ones which were dried (dehydrated) longer. There is no significant difference between the averages of the cohesion values of the three samples.

EXAMPLE 33

Example 1 is repeated up through the dehydration step. The dried processed soybean chunks are rehydrated by placing 100 grams thereof in 400 ml of boiling water for 25 minutes. These chunks are termed rehydrated chunks C.

200 grams of compacted soybean chunks obtained using the process described in U.S. pat. No. 2,162,729 are fully hydrated by boiling them for 1 hour 45 minutes (enough water is periodically added to keep the chunks covered as the water evaporated off). These chunks were termed prior art chunks 1. 200 grams of oiled, compacted soybean chunks obtained using the process described in U.S. Pat. No. 3,485,636 are fully hydrated in the same manner. These chunks are termed prior art chunks 2.

Texturometer tests are run on 20 specimens of each type of chunk, and the data therefrom is:

| CHUNKS | DATA HEADINGS | AVERAGE COHESION VALUES |
|---|---|---|
| Rehydrated Chunks C | x | 0.738 |
| | SD | 0.067 |
| Prior Art Chunks 1 | x | 0.606 |
| | SD | 0.041 |
| Prior Art Chunks 2 | x | 0.724 |
| | SD | 0.062 |

The hydrated chunks obtained from compacted chunks prepared according to U.S. Pat. No. 2,162,729 are significantly less cohesive than rehydrated chunks C (within the scope of this invention).

EXAMPLE 34

Example 1 is repeated twice up to the rehydration step. Rehydration is achieved for the first batch by placing one part of the dried processed soybean chunks in 4 parts of boiling water for 20 minutes, and for the second batch by boiling at the same water to chunk ratio for the same length of time. Texturometer tests are run on 5 specimens of each batch, and the data therefrom is:

| CHUNKS | DATA HEADINGS | AVERAGE COHESION VALUES |
|---|---|---|
| First batch | | |
| | x | 0.770 |
| | SD | 0.066 |
| Second batch | | |
| | x | 0.743 |
| | SD | 0.034 |

There is no significant difference between the average cohesion values of the two batches.

EXAMPLE 35

Example 1 is repeated up to the rehydration step. Three batches of the dried processed soybean chunks are rehydrated in boiling water, one for 10 minutes, one for 20 minutes, and one for 30 minutes. These are termed the invention chunks.

Oiled and compacted soybean chunks prepared as drecribed in U.S. Pat. No. 3,485,636 are hydrated in boiling water, one batch for 105 minutes, one batch for 120 minutes and one batch for 150 minutes. These are termed prior art chunks 4.

Texturometer tests and moisture analyses are for 5 specimens from each batch, and the data therefrom is:

| Chunks | Hydration or Rehydration Time, min. | Average Moisture Content of Chunks, Percent | Data Headings | Average Cohesion Value |
|---|---|---|---|---|
| Invention Chunks | 10 | 70.8 | x | 0.689 |
| | | | SD | 0.32 |
| | 20 | 73.0 | x | 0.718 |
| | | | SD | 0.066 |
| | 30 | 73.4 | x | 0.717 |
| | | | SD | 0.027 |
| Prior Art Chunks | 105 | 68.0 | x | 0.681 |

-Continued

| Chunks | Hydration or Rehydration Time, min. | Average Moisture Content of Chunks, Percent | Data Headings | Average Cohesion Value |
|---|---|---|---|---|
| | 120 | 69.3 | SD | 0.056 |
| | | | x | 0.731 |
| | | | SD | 0.100 |
| | 150 | 68.7 | x | 0.711 |
| | | | SD | 0.038 |

The above data is also presented in graphical form in the drawings.

Figure 3:
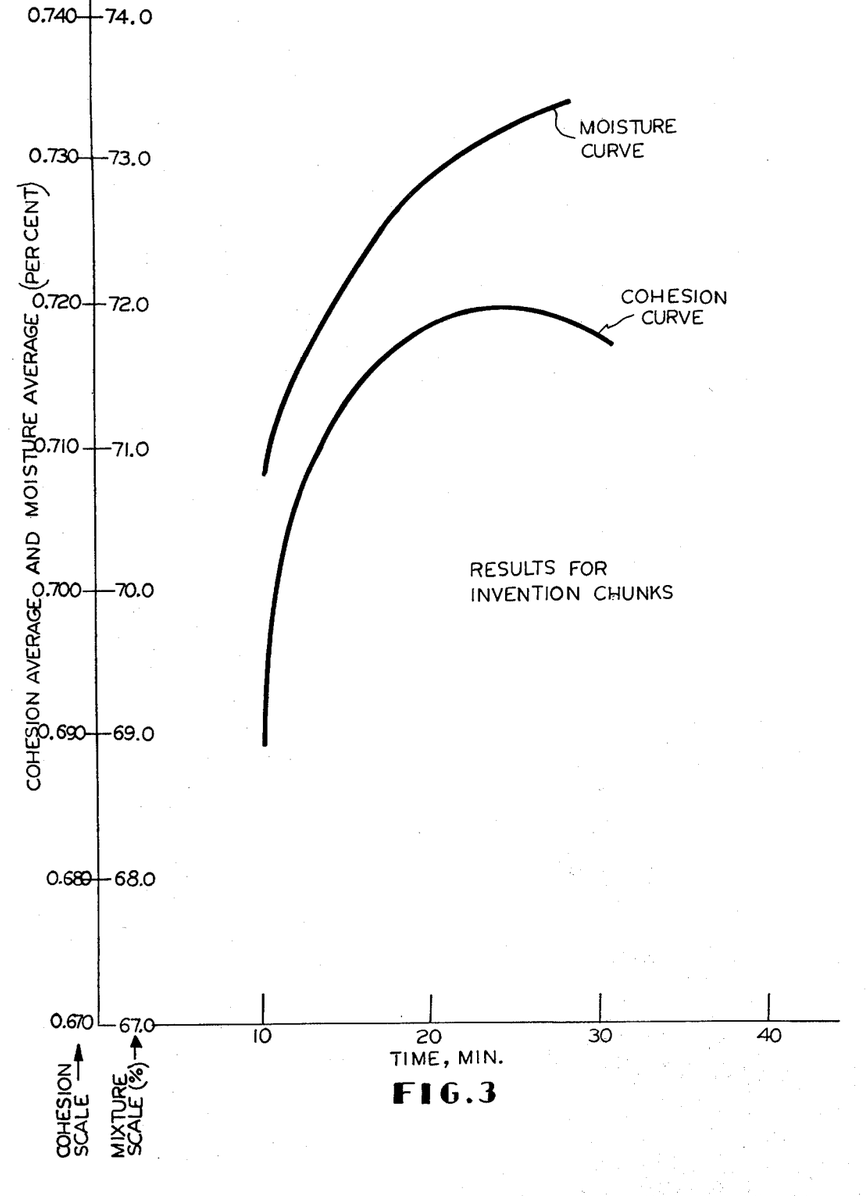
FIGS. 3 to 6 are graphs containing data and results from Example 34.
Figure 4:
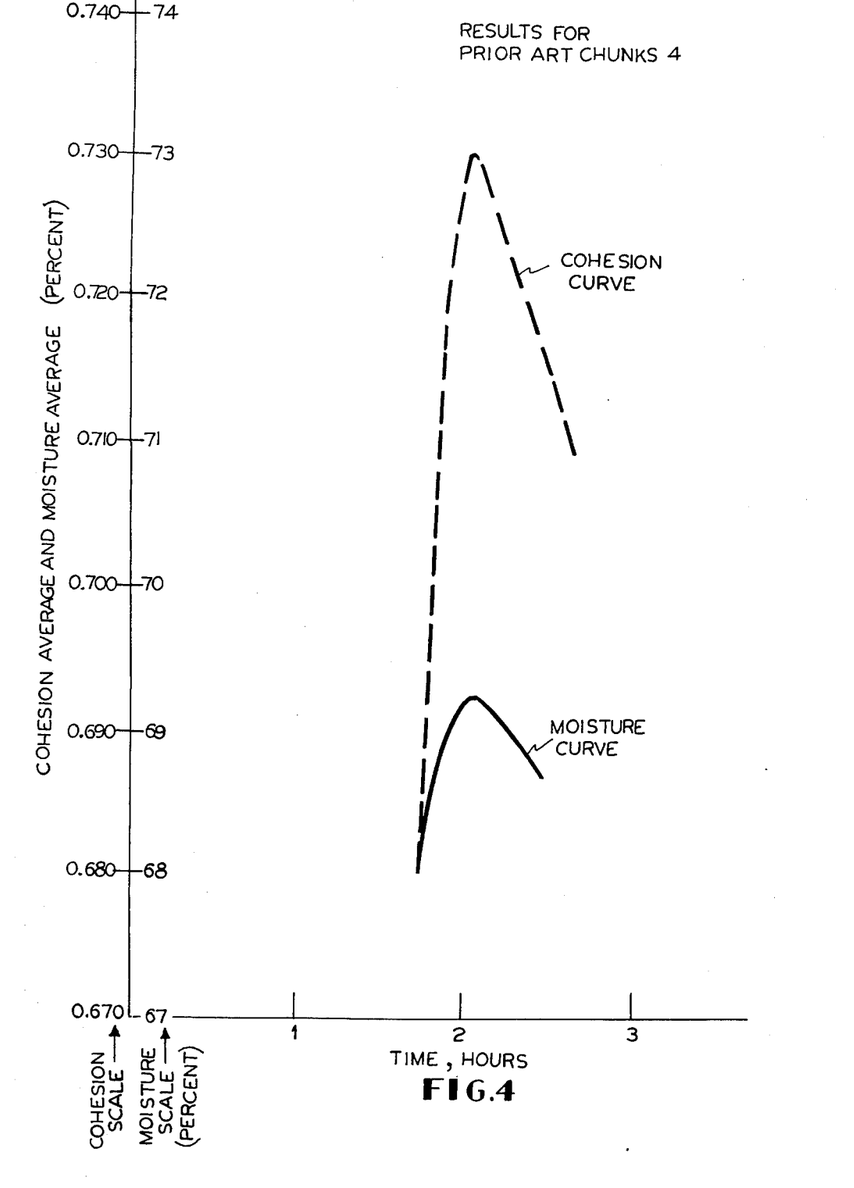
Figure 5:
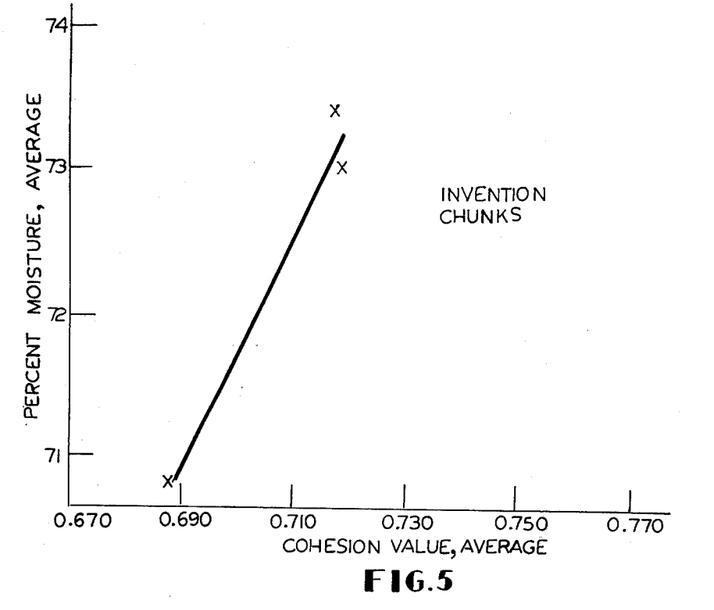
Figure 6:
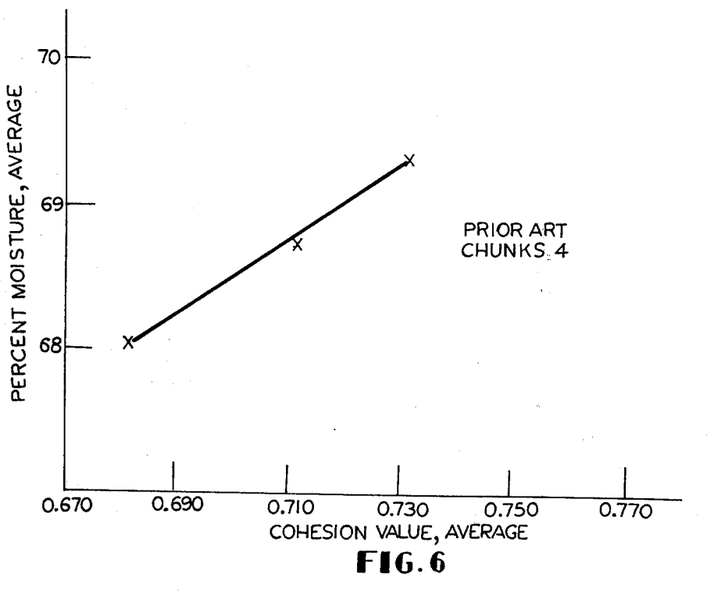

The moisture and texturometer data, on a time basis, for the invention chunks are set forth in graphical form in FIG. 3; the same is set forth for prior art chunks 4 in FIG. 4. A relationship between average cohesion value and average moisture content on a time basis exists for both types of chunks. FIG. 5 is a graphical relationship of the average moisture content and average Texturometer data for the invention chunks; and the same is set forth for prior art chunks in FIG. 6. A relationship exists between average moisture content and average cohesion value for each type of chunk, i.e., as the moisture content rises, the average cohesion value rises. There is no significant difference between average cohesion value for different rehydration times for the invention chunks. There is no significant difference between the average cohesion value for the invention chunks and prior art chunks.

Texturometer data is useful in a marketing and consumer sense only when it is used in conjunction with the sensory judgement (taste, odor, sight) of a consumer, which brings in play the full textural aspect and blandness of the rehydrated chunks of this invention.

EXAMPLE 36

The starting material is chunks of defatted dehulled, solvent-extracted, soybean material sold under the trade designation "Textrasoy" which is commercially available from H. B. Taylor Co., a division of National Can Co., and obtained by a thermoplastic compaction process.

The chunks are separated by screens to give retained chunks having a chunk size that pass through a U.S. No. 1 screen and stay on a U.S. No. 2 screen. The feed chunks are then treated as in Example 1 to obtain the final chunks. The feed and final chunks have the analyses (weight percent on a dry basis) as follows:

| | FEED CHUNKS | FINAL CHUNKS |
|---|---|---|
| Protein (N × 6.25) | 52.5 | 61.5 |
| Fat | 1.0 | 3.3 |
| Fiber | 3.0 | 3.0 |
| Ash | 6.5 | 5.2 |
| Carbohydrate (Difference) | 37.0 | 27.0 |

Comparison of this analysis of the dry chunks prepared according to this invention with the analysis set forth hereinabove for the feed chunks (initially prepared according to the U.S. Pat. No. 2,162,729) shows that the chunks according to this invention possess a protein content which is higher than the feed chunks.

The final chunks were rehydrated as in Example 1. The resultant rehydrated chunks are bland, light-colored, meat-like in texture and palatable. They do not contain any noticeable bitter beany-flavor and taste. Further, there is no objectionable odor when any storage package is opened, during the rehydration or at any time thereafter. The rehydrated chunks are very high in protein content. The rehydrated chunks have improved Texturometer cohesiveness over hydrated chunks produced by the method of U.S. Pat. No. 2,162,729. The rehydrated chunks have improved texture over known hydrated chunks. The cooking time to rehydrate the chunks of this invention is much shorter than those needed to hydrate the chunks of U.S. Pat. No. 2,162,729, U.S. Pat. No. 3,485,636 and the above-cited continuation-in-part application.

EXAMPLE 37

Example 1 is repeated except that the chunks are placed in plastic bags, sealed and stored at about room temperature, and then they are removed from the bags for the rehydration step.

What is claimed is:

1. A method of preparing a quick-cooking protein food product, which comprises palatable, meat-like in texture, bland, chewable chunks when hydrated, comprising the steps of:
   a. subjecting proteinaceous feed selected from the class consisting of solvent-extracted meal, grits, and flakes of a proteinaceous vegetable material having an NSI of about 30 to about 70 and containing moisture, to a mechanical pressure of at least 1,800 pounds per square inch for a time and at a temperature sufficient to convert said moisture into steam whereby said proteinaceous feed is partially disembittered, toasted without scorching, and is compacted into a hard and substantially fused mass;
   b. fragmenting the mass into chunks;
   c. heating the chunks at atmospheric pressure in hot water at a pH of about 5 to about 10 for a period of time selected in accordance with the mean size of the chunks, and sufficient in length to substantially hydrate the chunks and to dissolve out soluble constituents whereby the chunks are softened to a chewable consistency;
   d. separating the chunks from said water containing said dissolved out soluble constituents; and
   e. drying the chunks, whereby chunks are obtained which are cohesive, porous, bland, storable, appetizing in appearance, high in protein and quick and easy to cook or prepare for consumption and which are chewable, light-colored, meat-like in texture, bland and palatable when hydrated.

2. A method as claimed in claim 1 wherein the proteinaceous feed used in step (a) contains from about 5 to about 10 percent by weight moisture.

3. A method as claimed in claim 1 wherein the proteinaceous feed is heated before step (a) so that the moisture content thereof is reduced to between about 6 and about 8 percent by weight.

4. A method as claimed in claim 1 wherein said proteinaceous feed has a protein content of 30 weight percent or more.

5. A method as claimed in claim 4 wherein said proteinaceous feed has an NSI of 45 to 60.

6. A method as claimed in claim 1 wherein a pressure between 2000 and 5000 pounds per square inch is applied in step (a) at a temperature between about 150° and about 200°C.

7. A method as claimed in claim 1 wherein the proteinaceous feed is subjected to heat and pressure in step (a) from 1.5 to 5 minutes.

8. A method as claimed in claim 1 wherein the hot water in step (c) has a temperature of at least 150°F.

9. A method as claimed in claim 1 wherein the hot water in step (c) has a temperature between 190° and 212°F.

10. A method as claimed in claim 1 wherein the chunks are heated in step (c) for between about 1¼ and about 1½ hours.

11. A method as claimed in claim 1 wherein said hot or boiling water has a pH between 6 and 7.

12. A method as claimed in claim 1 wherein the chunks are washed with water after step (d) but before step (e).

13. A method as claimed in claim 12 wherein said wash water is warm water having a temperature between 130° and 160°F.

14. A method as claimed in claim 1 wherein the drying in step (e) is achieved by contacting the chunks with hot air.

15. A method as claimed in claim 1 wherein the drying step (e) is conducted until the final moisture content of the chunks is about 4 to about 6 percent by weight.

16. A method as claimed in claim 1 wherein said mass is fragmented into chunks which will pass through a one inch opening screen and be retained on a one-half inch opening screen.

17. Chewable, light-colored, meat-like palatable chunks obtained by hydrating the chunks obtained by the method of claim 16 in hot water.

18. Food formulations which include the dry chunks obtained by the method of claim 16.

19. Chunks which are cohesive, bland, light-colored, porous, storable, palatable, appetizing in appearance, quick and easy to cook or prepare for consumption and high in protein and which are produced by the method of claim 1.

20. Frozen food formulations which include the chunks of claim 19 in rehydrated form.

21. Canned food formulations which include the chunks of claim 19 in rehydrated form.

22. Pet food formulations which include the chunks of claim 19 in rehydrated form.

23. Food and feed formulations which include the chunks of claim 19 in rehydrated form.

24. A process wherein the chunks resulting from the method of claim 1 are hydrated by placing them in boiling water for at least 5 minutes or in hot water for at least 10 minutes. whereby meat-like chunks are obtained.

25. A method as claimed in claim 1 wherein vegetable oil or other type of food grade oil is added to said proteinaceous feed before it is subjected to step (a).

* * * * *